United States Patent [19]

Beni et al.

[11] Patent Number: 4,871,252

[45] Date of Patent: Oct. 3, 1989

[54] METHOD AND APPARATUS FOR OBJECT POSITIONING

[75] Inventors: Gerardo Beni, Santa Barbara; Alan Mar; C. John Landry, both of Goleta, all of Calif.

[73] Assignee: The Regents of the University of California, Berkeley, Calif.

[21] Appl. No.: 926,074

[22] Filed: Oct. 30, 1986

[51] Int. Cl.[4] ............................................. G01B 9/021
[52] U.S. Cl. ...................................... 356/347; 356/375
[58] Field of Search ................. 356/71, 347, 348, 363, 356/375, 388, 394, 400; 250/557, 561

[56] References Cited

U.S. PATENT DOCUMENTS

| | | | |
|---|---|---|---|
| 3,592,548 | 7/1971 | Majkowski | 356/347 |
| 3,634,682 | 1/1972 | Gold | 250/201 |
| 3,647,284 | 3/1972 | Elings et al. | 350/294 |
| 3,721,498 | 3/1973 | Narodny et al. | 356/348 |
| 3,884,580 | 5/1975 | Webster et al. | 356/106 R |
| 4,299,492 | 11/1981 | Etzel et al. | 356/386 |
| 4,435,837 | 3/1984 | Abernathy | 356/394 |
| 4,526,465 | 7/1985 | Corti et al. | 356/35.5 |
| 4,575,637 | 3/1986 | Sullivan, Jr. | 356/375 |
| 4,585,349 | 4/1986 | Gross et al. | 356/375 |
| 4,589,746 | 5/1986 | Pavone | 356/358 |

OTHER PUBLICATIONS

Dirtoft et al., SPIE, vol. 211, Optics and Photonics, Applied to Medicine (1979), pp. 106-110.
Robert J. Collier et al., "Optical Holography", Student Edition, Copyright 1971, Bell Telephone Laboratories, Inc., Academic Press, United Kingdom Edition, Published by Academic Press, Inc. (London), Library of Congress Catalog Card Number: 74-137619, (618 pages).
Steve Belinski et al., "Intelligent Robot Vision System for Inspection and Assembly of Submillimeter-Sized Components", Ctr. for Robotic Systems in Microelectronics UC Santa Barbara, (six pages), This Work was Carried out Under National Science Foundation Grant #08421415.
Programmable Controller System, 855C Programmable Controller Newport Corporation, #855 (includes 855C & 855K), (9 pages).
Automatix Product Bulletin: Autovision Artificial Vision Lab Development Package, Autovision Hardware and Software to Develop and Demonstrate Artificial Vision Applications, (4 page Photocopies), 1985, Automatrix Inc., PB-AV-061/85 5K.
Rail Software Reference Manual for Autovision Systems, Rev. 5.50 Al Document No. MN-AV-05 Al Part No. 510-201005, Automatrix Inc., 1000 Tech Park Dr., Billerica, MA 01821, Al#510-01000 (80 pages).
2 Opaque Objects: Measurement of Displacement and Deformation (pp. 66-127), Includes; 3 Opaque Objects: Formation & Localization of Fringes.
Precision Motorized Linear Actuators; Models 850-05; 850-1; 850-2; 850-4, 850 Series Typical Speed vs. Load Performance, Speed Changes Less Than 5% from no Load to 25lb . . . Page Number 73, One Photocopy, NRC.

Primary Examiner—F. L. Evans
Attorney, Agent, or Firm—Peter J. Dehlinger

[57] ABSTRACT

Method and apparatus for positioning a three-dimensional object at a preselected position within a workstation. An optical system in the apparatus creates a 3-dimensional image of the object at the selected preselected position. An imaging device in the apparatus detects macroscopic features related to the extent of volume overlap between the object and image, and this information is used to direct the object, through a mechanical drive, toward a position of greater volume overlap with the image. In one aspect of the invention, the optical system produces a holographic image, and the imaging device is designed to detect both macroscopic features related to volume overlap, and interference fringes which form when the volume overlap between the image and object is within about 50 microns, providing object positioning to within about 50 microns. The apparatus may further include a system for analyzing the interference fringes, to determine the direction of object movement which increases fringe spacing, allowing volume overlap down to 1-3 microns or less.

7 Claims, 5 Drawing Sheets

METHOD AND APPARATUS FOR OBJECT POSITIONING

The project relating to this invention was funded in part by grant CDR-8421415 from the National Science Foundation. The government has certain rights in this invention.

FIELD OF THE INVENTION

The present invention relates to object positioning, and in particular, to a method and apparatus for positioning a three dimensional object at a precise location within a work station.

REFERENCES

Collier, R. J., Burkhardt, C. B., and Lin, L. H., *Optical Holography*, Academic Press, Inc. (1971).

Cunningham, R. "Segmenting Binary Images", Robotics Age, July/Aug. pp 4-119, 1981.

Gonzales, R. C., et al, *Digital Imaging Processing*, Addison-Wesley, Reading, MA (1977).

Jones, Robert, and Wykec, Catherine, *Holographic and Speckle Interferometry*, Cambridge University Press, Cambridge, Mass., pp. 74-121. 1983.

Ostrovsky, Y. I., Butusov, M. M., and Ostrovskaya, G. V., *Interferometry by Holography*, Spring-Verlag, Berlin, pp. 228-265. 1980.

Pethovsek, J., and Ranmkel, K., "Measurement of Three Dimensional Displacements by Four Small Holograms," Proc. SPIE, 210, 173. 1979

Schumann, W., and Dubas, M., *Holographic Interferometry*, Springer-Verlag, Berlin, pp. 77-85. 1979.

Sixt, W., and Engelsberger, J., "Holographic Applications of Computer-based Fringe Interpretation," Proc. SPIE, 599, 97. 1985.

Stimpjling, A., and Smigielski, P., "A New Method for compensating and measuring any Motion of 3-D Objects in Holographic Interferometry: Recent Developments," Proc. SPIE, 1600, 194. 1985.

Vest, Charles M., *Holographic Interferometry*, John Wiley and sons, New York, N.Y., pp. 68-125. 1979.

BACKGROUND OF THE INVENTION

Many potentially important uses of robotics involve precise positioning of 3-dimensional objects in a work station. For example, precision machining operations require placing the machining tool and workpiece in a well-defined spatial relationship. In optical fiber assembly, it is advantageous, in producing high-efficiency fiber coupling, to bring two fibers together within as little as a few microns, without damaging the fibers by actual contact. Another important application of precision-positioning robotics is in microelectronics, where sequential surface etching and metallizing operations require precise positioning of the chip substrate with respect to automated surface-treatment devices. Typically, substrate positioning to within a few microns or less is desired.

Robotics positioning is also needed in a variety of tasks, such as machine assembly of parts, robot-assisted surgical procedures, and space docking operations, where micron-range precision may not be required. Nontheless, the workpiece must be placed and oriented accurately in 3-dimensional space, typically with a precision of 0.1 to 1 millimeters.

Several methods for positioning an object in a workstation by robotic (automated) control have been proposed in the prior art. One common approach involves the use of rigid mating fixtures. Here a fixture is designed so that a robot-controlled object fits into it in a specific position, for purposes either of calibration or position control. This technique has the disadvantages, however, that the robot must avoid collision with the fixture, and generally can approach the fixture from one direction only, when attempting to mate with it.

In another positioning method, a robotic arm (effector) is programmed to return to a selected "memorized" position after picking up a workpiece. The position resolution achievable with this method is limited in part by positional variation which is related to slippage, wear, and/or variable effector response in the mechanical coupling. A second limitation is that the position of the workpiece in the robot arm will vary from one pick-up to another, and thus the actual position of the workpiece cannot be accurately related to robot arm position.

Vision systems are also used for robot positioning and calibrating robotic movement. A typical system uses a digital video camera which is focused for viewing a robot end effector carrying the object of interest. Positioning is achieved by moving the robot until a fiducial mark carried on the effector or workpiece arrives at a desired location in the video image. This approach (involving one camera only) cannot be used where three-dimensional displacements are involved. A second limitation of the method is the need for high magnification to achieve high-resolution positioning. For example, if 1-micron resolution is desired, each pixel of the video image must be less than 1 micron wide. Since typical video cameras use sensor arrays of about $350 \times 350$ pixels, the field of view would be less than about 1 mm$^2$. Such a small field would be unsuitable for many of the applications indicated above.

Small displacements and surface deformations, in the approximately 1-50 micron range can be measured by holographic interometry. This method is based on the interference fringes which form when a holographic image of an object is exactly superimposed with the object itself, and the object undergoes local surface deformation (producing local interference effects) or small, rigid-body translation (producing overall interference). This method, by itself, is unsuitable for many robotics positioning problems, since interference bands are not produced unless the object and image are already in near superposition.

All of the systems mentioned above are based on positioning with respect to a fixed-position reference, such as a fixed robot base or a camera placed at a fixed position in space. Thus, the systems are not applicable to a variety of tasks involving positional interactions between two mobile robots, such as in docking procedures, and object transfer between a robot and another movable system.

SUMMARY OF THE INVENTION

It is one general object of the invention to provide, for object positioning in three-dimensional space, a method and apparatus which substantially overcome or reduce above-mentioned problems associated with the prior art.

One particular object of the invention is to provide such method and apparatus for positioning a three-dimensional object at a preselected, macroscopic position in a workstation.

A related object is to provide such a method and apparatus for positioning the object the object within about 50 microns, in any direction, of the preselected position.

Still another object of the invention is to provide, in such a method and apparatus, the capability of object positioning, at the preselected position within the workstation, to a resolution of only a few microns or less.

The method of the invention involves first producing, i.e., creating, a three-dimensional image of the object to be positioned at the selected "end-point" position within the workstation. The object is now positioned for volume overlap with the image, and the degree of volume overlap is measured. In response to this measurement, the object is moved to a position of greater volume overlap with the image, and the measuring and moving steps are repeated until a selected degree of volume overlap is achieved.

In one embodiment, the object includes a volume element whose size and pattern, in a two-dimensional projection, determine its orientation in space and its distance from a selected viewing plane, and the image carries a pattern which matches that of the volume element, in a two-dimensional projection, when the object and element have a maximum measurable volume overlap. The measuring step then includes determining the extent to which the pattern associated with the volume element matches that associated with the image.

In this embodiment, the object may be first oriented in space, by angular movement, and positioned with respect to the selected viewing plane, to produce a pattern which can be matched, in size and orientation, with that associated with the image. The object is then moved to a position which produces actual pattern matching between the object and image.

In another aspect of the invention, for use in high-resolution macroscopic positioning, the image is formed by holography, and the object is moved into volume overlap with the image until interference fringes between the image and object are observed, evidencing a position resolution of about 50 microns or less.

In still another aspect, for use in microscopic positioning to a resolution of a few microns or less, the interference patterns which form at a sub-macrospoic resolution are analyzed to determine the directions of object movement needed to maximize the spacing between the pattern fringes. The object is moved incrementally in the determined directions, and the analysing and moving steps are repeated until a desired increase in fringe spacing is achieved.

In one preferred method for achieving microscopic positioning, the object and image each define two non-parallel reference surfaces, and the analysing and moving steps are separately applied to the fringes produced at each pair of corresponding surfaces.

The invention also includes an apparatus for automated macroscopic positioning of a three-dimensional object, according to the method above described. The apparatus includes an optical system for producing a 3-dimensional image of the object at such preselected position, and a mechanical drive system for moving the object in the workstation toward a position of macroscopic volume overlap with the image. An image device in the apparatus detects macroscopic features related to the extent of volume overlap of the object and the image, and a position calculating system operatively connected to the imaging device and drive system directs the system, in response to information received from the imaging device, for moving the object in a direction which produces greater volume overlap between the object and image.

The optical system in the apparatus preferably includes a holographic system which directs a real or virtual holographic image of the object at the preselected position in the work station. The imaging device may be designed for detecting interference fringes which form when the object is brought within about 50 microns of volume overlap with the image.

Where the apparatus is designed for producing microscopic positioning, to a resolution of a few microns or less, the image is produced by holography, the mechanical drive system is designed for moving the object in micron-range increments, and the position calculating means is designed for analysing holographic interference fringes, to determine the direction of object movement needed to reduce the curvature of and maximize the spacing between the interference pattern fringes.

These and other objects and features of the invention will become more fully apparent when the following detailed description of the invention is read in conjunction with the accompanying drawings.

DETAILED DESCRIPTION OF THE INVENTION

I. Positioning Apparatus

Figure 1:
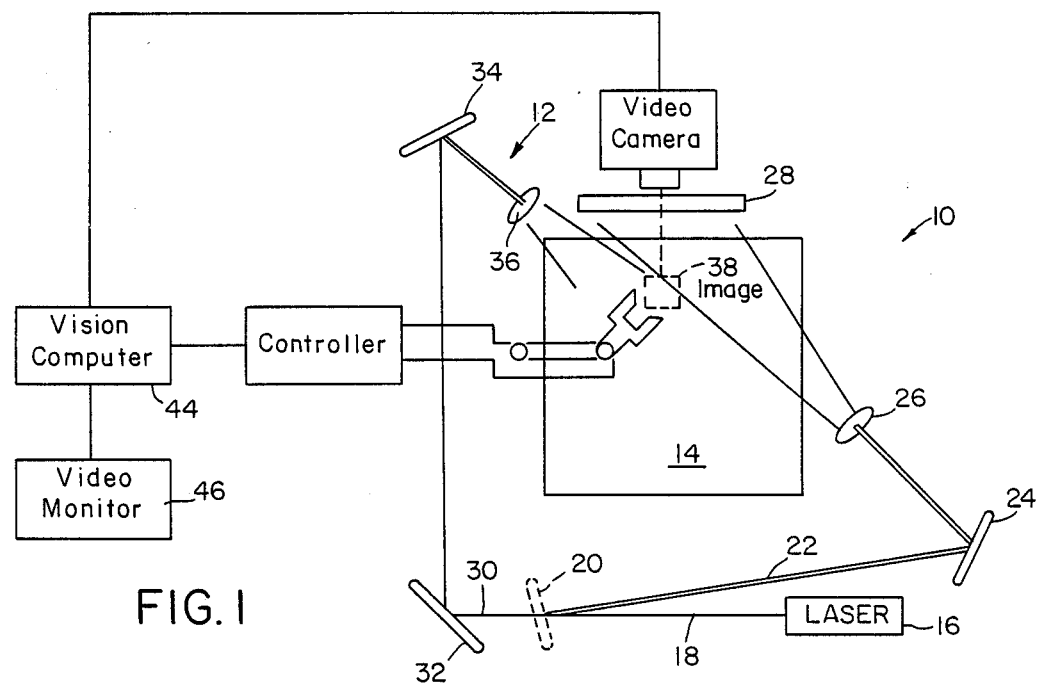
FIG. 1 illustrates, in somewhat schematic view, a positioning apparatus constructed according to one general embodiment of the invention.

This section describes the components of the object positioning apparatus. One preferred embodiment, illustrated generally at 10 in FIG. 1, is designed for both macroscopic and microscopic object positioning, and for object positioning at any orientation and position in three-dimensional space. It will be understood from the description of the components, and their operation, how the apparatus can be designed for either large or small distance operation, and/or where the object motion is constrained to limited degrees of freedom.

A. Optical System

The apparatus of the invention includes an optical system 12 for producing, i.e., creating a three-dimensional image of a workpiece at a selected position within a workstation 14, as indicated. The optical system is composed of a laser 16 whose beam 18 is directed to a partial mirror 20 which splits the beam into two. One of the two beams, indicated at 22, is directed to mirror 24 and is reflected to pass through lens 26, which spreads the beam to illuminate a holographic plate 28. The other of the two beams, indicated at 30, is reflected by mirrors 32, 34, and then passes through a lens 36, where it illuminates the object to be positioned. The components of the optical system are mounted on a pneumatically cushioned frame conventionally.

One suitable type of laser is a Spectra-Physics Model 124 He-Ne (633 nm) laser, although higher power lasers may be preferred for producing brighter interference fringes, during a positioning operation. Newport Corporation 99 spatial filter assemblies are suitable for lenses 26 and 36. Where the apparatus is used for microscopic positioning, e.g., where interference fringes form the basis of measuring object position, it is important that the system be designed for high-resolution, low distortion, and preferably high fringe brightness. The reader is referred to a number of general reference works in the area, including texts by Collier, et al, Schumann, et al, Jones, et al, and Vest, for a discussion of lens components, laser light sources, lens positioning, and motion damping factors which are employed in high-resolution holography, particularly, as it is applied to real-time interferometry.

The holographic image, indicated at 38 in the figure, is formed initially by placing the object to be positioned at the selected position in the workstation and exposing a hologram recording plate to the spread reference beam from lens 26, and the reflected light from the object produced by object illumination with the object beam from lens 36. The photographic image which forms on the plate is thus a record of the interference between the reference waves and the reflected subject waves.

The recording plate may be any suitable recording material, such as a silver halide photographic emulsion, dichromated gelatin films, and photoconductor/thermoplastic films, all of which have been well characterized in holographic uses. An advantage of emulsion type film is that the film plate can be developed in place, and thus image-position inaccuracies which can arise in removing and replacing the plate are avoided. Thermoplastic material also reduces film distortion effects which may be observed with emulsion-type films.

When the developed hologram is illuminated with the spread beam from lens 26, there is produced a three-dimensional virtual image of the hologram "object" when viewed through the hologram, i.e., from above the hologram in the figure. Assuming that the position of the hologram with respect to the reference beam remains unchanged, the virtual image will located at the position occupied by the object during hologram formation. In one aspect of the invention, the virtual image is used for macroscopic positioning of the workpiece, by a method of volume overlap of the image and object. It is noted that this embodiment does not require object illumination by a coherent light source, since the phase relationship between the waves from the reflected image, and the hologram waves forming the virtual image is not exploited. That is, the object itself can be illuminated by ordinary non-coherent light, rather than the spread beam from lens 36.

Other aspects of the invention, related to object positioning to a resolution of about 50 microns or less, are based on the appearance and character of interference fringes which form by the optical system shown as the object approaches a position of coincidence with the virtual holographic image, as will be detailed below.

The optical system shown can be adapted for producing a real image of the object, for positioning by volume overlap between the object and the real image. Here the real image is produced by illuminating the hologram by a retroreflected reference beam, or conjugate beam, or, by focusing the light waves produced by the illuminated hologram with a lens system, according to standard holographic techniques (Collier). The image is used for macroscopic positioning by direct volume overlap matching, and may be further used in microscopic positioning. In the latter application, the the object being positioned is illuminated with a coherent light source which is phase-related to the coherent source used in illuminating the hologram. One limitation of the real-image system, it should be noted, is that the image can be partially or totally blocked by movement of the object into the imaging beam.

In an apparatus for macroscopic positioning only, the real (or virtual) image produced by holography can be produced by a simple laser optical system which does not require a high degree of motion damping, position stability, and a coherent, phase-related beam for object illumination. Such systems are readily constructed according to known design principles.

Optical display devices for producing real three-dimensional images using non-coherent light are also known. U.S. Pat. #3,647,284, for example, discloses an optical system in which a pair of confronting concave mirrors are used to project a three-dimensional image of an object placed between the mirrors. The system would be suitable for macroscopic, but not microscopic positioning.

B. Mechanical Drive System

The mechanical drive system in the apparatus functions to move a workpiece from one location, typically a pick-up location, to the selected position in the workstation. With reference to FIG. 1 the system generally includes and end effector 40, which performs the actual mechanical operation of the system, and a motor controller 42 which controls the drive motors of the effector, to effect desired movement.

Many types of mechanical effectors are available, and the system which of choice will of course depend on such factors as the size and weight of the workpiece, the degrees and extent of movement required, and the position resolution which is needed. In the simplest case, the effector is a linear actuator or the like which is designed to moved the object supported by the drive system along a linear path from a pick-up station to the selected position in the workstation. Here positioning by volume overlap can be accomplished simple by moving the object translationally in the effector until a maximum volume overlap is observed. In the usual case, the effector will also provide, in addition to at least one degree of translational motion, one or more degrees of rotational movement which will allow positioning by a combination of translational and rotational movement.

For purposes of illustration, the effector used in the present apparatus will be assumed to provide three degrees of translational movement along mutually orthogonal X-Y-Z axes, and three degrees of rotational movement about the same axes. This type of effector is illustrated by an overhead gantry system or the like in which a robotic arm or effector is carried on a vertically shiftable member mounted on a platform for shifting in the X–Y plane. The arm itself is mounted at the distal end of the shiftable member, for rotation about all three axes, and carries at its distal end, a gripping mechanism for picking up and supporting a workpiece for positioning.

The motor controller is a conventional servo control device which receives digital input from a microprocessor, to effect desired translational or rotational movements in the effector. Such controllers are available for a variety of commercial effectors, and their interfacing with and control by microprocessors is readily accomplished with a number of commercial drive systems which can be used in the present invention.

C. Imaging Device

The imaging device in the apparatus functions to convert the workstation scene being viewed to a two-dimensional array of picture elements, or pixels, where each pixel has a scalar or vector quantity which associates some physical property of the image, such as object brightness or color, with that element. The device is preferably one or more conventional video cameras, such as camera 41 shown in the figure, each having a sensor array of about 350×500 pixels. Each camera is positioned and focused for viewing a pattern associated with the image at the selected loaction in the workstation. The camera may be equipped with two or more lenses, or a zoom lens, for viewing regions of the workstation at different resolution levels.

D. Position-Calculating System

The link between the imaging device and drive system in the apparatus is a position-calculating microprocessor system which (a) analyses the image seen by the image system (b) calculates from this analysis, the required rotational and/or translational movements needed to achieve desired pattern matching between the object and image, and (c) instructs the drive system controller to carry out the calculated movements.

Image analysis is preferably performed by conventional binary connectivity analysis of the pixel-array image from the video camera. Briefly, the pixel brightness values are initially assigned one of two binary labels, depending on whether their brightness value is above or below a selected threshold level. The binary labels are then compared, on a pixel-by pixel basis, with two orthogonally and one diagonally adjacent pixels (6-connectivity), to determine whether the pixel being tested is part of an existing object (blob) being characterized, or defines the beginning of a new object (such as would occur at the light background boundary of a dark object in the image field). The analysis can be used to identify and characterize the two-dimensional shapes of all distinctly labeled objects in the field, determine the relative positions of the identified objects, and calculate desired geometrical properties of the objects, such as area moments, and perimeter. As will be seen below, objects which are identified and characterized by the analysis are volume-related features whose shape and/or pattern and size are determined by the orientation and position of the workpiece.

The reader is referred to a number of standard works (e.g., Cunningham) for a detailed discussion of the connectivity-analysis method. Where the volume related features in the workpiece are multi-valued features, e.g., features having more than two different colors, the analysis may be carried out efficiently by by the connectivity analysis described in co-owned U.S. patent application for "Object Analysis of Multi-Valued Images", Ser. No. 898,076, filed Aug. 18, 1986.

Following image analysis, the position-calculating system determines how the object being viewed must be moved so that it can be placed in a position of maximum volume overlap with the projected three-dimensional image. Generally, this will involve identifying corresponding features on the image and object, and moving the object so that these features are accurately matched, e.g., by feature overlap. This type of feature mapping can be performed in a variety of ways. For example, the volume-related features may be three non-linear reference points, where the system is designed to match (overlap) each reference point sequentially. This type of analysis can be done by employing a stereo imaging system which views the object and image from two different angles, e.g., from orthogonal directions. Here, each point would first be matched in one plane (the 2-dimensional projection of the object seen by one camera), and then in the second plane (the projection of the object seen by the other camera).

An alternative method, which will be described in Section II, uses only the two-dimensional projection of the object for determining the volume overlap of the object with the three-dimensional image. In this method, the object is provided with one or more volume elements which produce, in a two-dimesional projection, a binary pattern which can be used to determine the orientation of the object in three-dimensional space. The system first moves the object rotationally to achieve the desired pattern, as seen by the camera. With the object now properly oriented for volume matching, the object can be readily moved into positions of feature overlap with the image, by X-Y-Z translational movement only. That is, rotational and translational degrees of freedom are effectively separated. The design of the machine algorithm for carrying out the volume overlap, by the method just outlined, will be apparent from the operation described in Section IIA below.

As indicated above, the apparatus may be designed for achieving sub-macroscopic resolution, on the order of about 50 microns. The operation of the system in this embodiment is like that just described, but with the following modifications: The camera is focused for resolving volume-related features to a resolution of at least a few hundred microns, so that the the position of fringe formation can be identified, if necessary, by imaging the object repeatedly as it is moved systematically within a limited-size volume element, e.g., the spherical volume element which is within about 100 microns of the macroscopically positioned object. Preferably, the pixel resolution is approximately 50 microns, so that the appearance of fringe bands are used to define an "end point" for accurate macroscopic positioning. Assuming a desired pixel resolution of about 50 microns, and a camera with 350×500 pixels, the field of view would be about 17×25 mm. This degree of resolution could be achieved, for example, by switching to a high resolution, small-field lens after gross positioning with a lower-resolution lens.

Secondly, the system must be designed for detecting interference patterns. Various image processing techniques are available for detecting and enhancing spaced-line patterns of the type which would be observed. Fringe enhancement by lowpass filtering, histogram modification techniques, and edge sharpening methods are known, or readily adaptable from well-known image enhancement methods (Gonzales). Additionally, image subtraction and reduction methods can be used to eliminate or reduce the pre-intereference video image. These enhancement techniques may be employed only after approximate volume overlap is achieved, i.e., only after the system has been switched to a mode capable of higher-resolution pixel resolution.

In a preferred embodiment, the position-calculating system is additionally designed to analyse the fringe patterns which form on sub-microscopic superposition of the image and object, to determine the direction of object movement needed to reduce the curvature of and increase the spacing between the fringes. The interference patterns are characterized by connectivity analysis to determine the character of the pattern, and the spacing and inclination of the fringe lines. This information is then analysed, according to the general principles described in Section IIB, to determine object-motion corrections.

After motion analysis, according to the above methods, the system supplies appropriate input signals to the motor controller, to effect the desired motion calculated by the device. The design of the system, for interfacing with and instructing a conventional motor controller is readily implemented for commercially available imaging systems.

The vision system may also include a video monitor 46, as shown, for user monitoring of the imaging and/or object movement procedures.

One commercially available visual system for use in the apparatus is AUTOVISION AV-3 Artificial Vision Lab Development Package, supplied by Automatix (Detroit, MI; Billerica, MA). This system is a special-application minicomputer that has high calculation speed and features hardware and software tailored for machine-vision applications. The system has data storage buffers to store images in digitized form, and the capability of processing images on a pixel-by-pixel basis. The system uses RAIL software which is designed and modifible for special image analysis problems, including connectivity analysis (RAIL Software Reference Manual, A1 Document No. MN-AV-05, Billerica, MA). The connectivity analysis software supplies information on the size, orientation, number of objects identified, and other features. The computer is also designed to send commands to the motor controller that drives the effector.

II. Object Positioning

Figure 2:
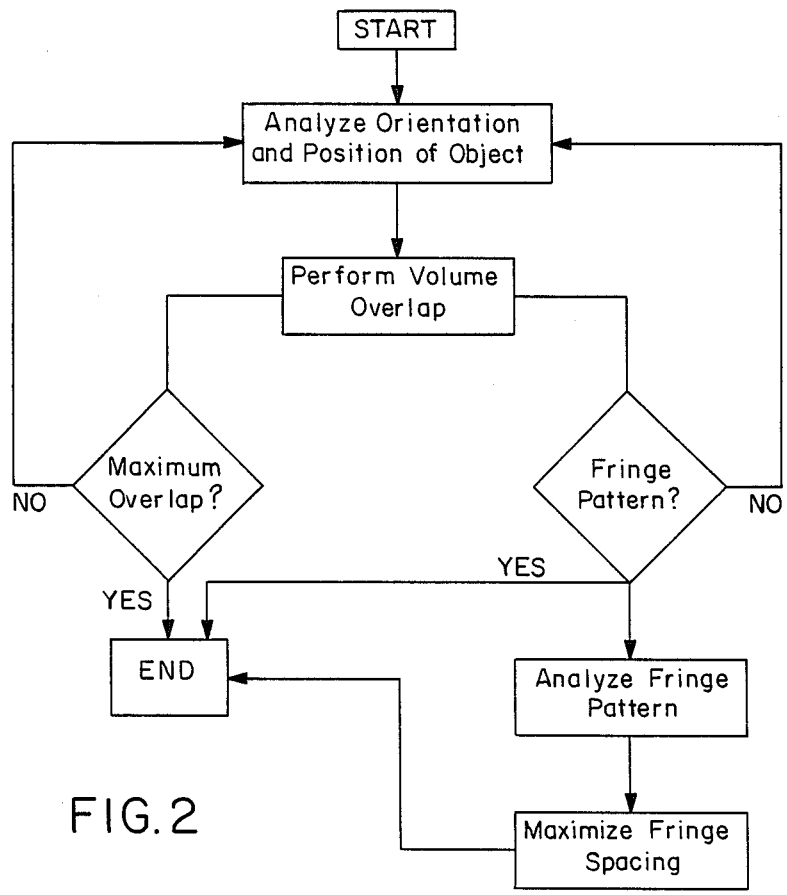
FIG. 2 is a flow diagram of the operation of the apparatus of the invention in various embodiments.

FIG. 2 is a flow diagram of the object-positioning operations which are performed by the above apparatus. In the initial positioning operation, the position and orientation of the object are analysed, and the object is moved to a location of volume overlap with the three-dimensional image. This analysis and movement is carried out in a manner which brings the object into an orientation and location for successively greater volume overlap with the image, as described in Section IIA. Where macroscopic positioning only is desired, the method may terminate when the observable macroscopic volume overlap is maximized. Alternatively, the method may be extended, as indicated to achieve high resolution-macroscopic positioning, based on the appearance of interference fringes. Microscopic positioning, to a resolution of a few microns or less, based on the relationship between interference fringes and object displacement, is detailed in Section IIB.

A. Macroscopic Positioning

Figure 3A:
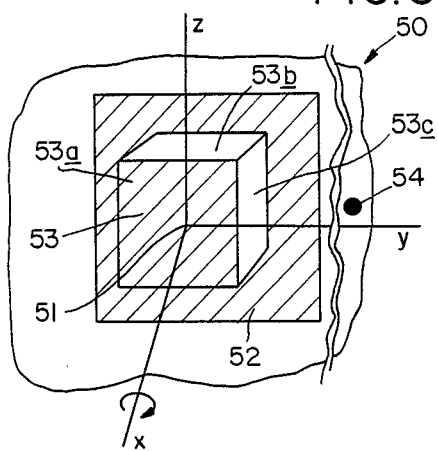
FIG. 3 illustrates object-movement steps A-F in a method for achieving macroscopic volume overlap with a three-dimensional image, according to one embodiment of the invention.

FIG. 3A shows a portion of an object 50 which is to be positioned macroscopically, according to the method of the invention. The object is provided with a volume element 52 which is designed to produce a binary pattern, as the object is viewed by a video camera, that is dependent on the orientation of the object in space. That is, the projection of the volume element onto a plane produces a two-dimensional pattern which is characteristic of the orientation of the element in three-dimensions. The element shown in the figure includes a black planar square 51, and a cube 53 which is located symmetrically on the square. The front face 53a of the cube is black, and each of the four side faces, such as faces 53b, 53c, are white, with the side edges of the cube, such as the edge between faces 53b, 53c, being delineated by a black strip. The object is also provided with one or more reference points, such as point 54 which are spaced from the volume element and which are used for determining both orientation and location of the object, for purposes of achieving volume overlap.

Figure 3B:
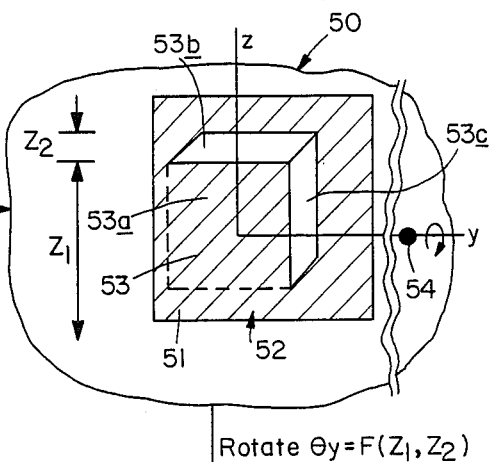
Figure 3C:
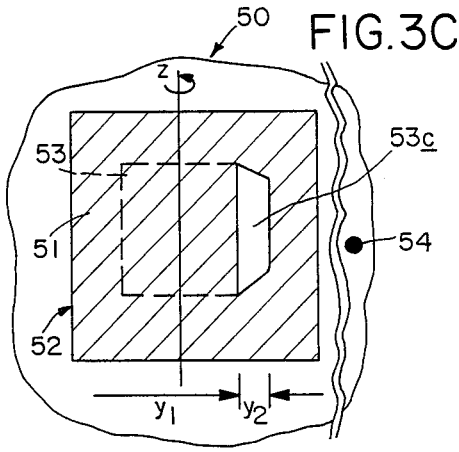
Figure 3D:
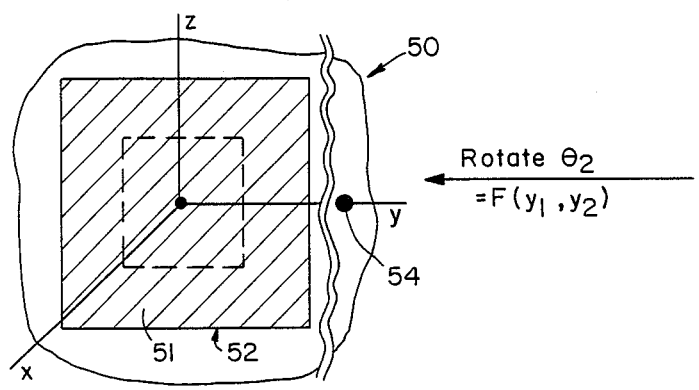
Figure 3E:
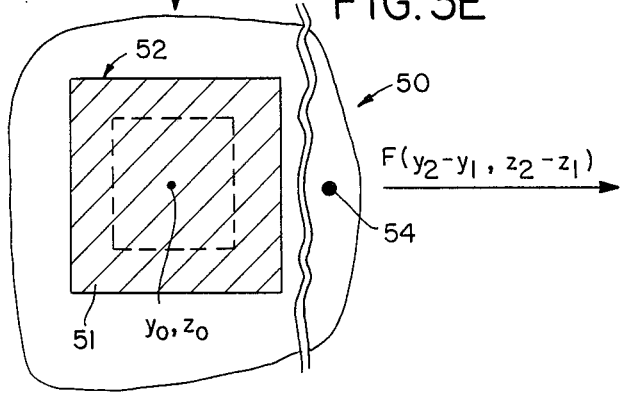
Figure 3F:
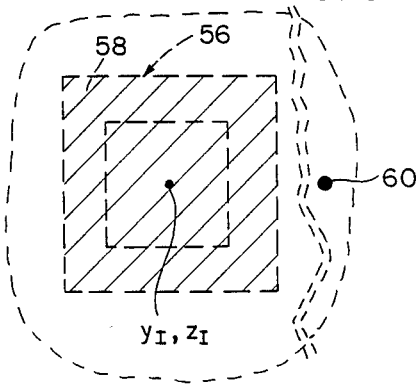

The image of the object, which is shown at 56 in FIG. 3F, is provided with a pattern element 58 which serves as the template pattern for volume element 52, i.e, the pattern which is attained when the object is correctly oriented in space. The image also has one or more reference points, such as point 60, corresponding to identically placed points, such as point 54, on the object.

The objective of the positioning method is to produce maximal volume overlap between the object and image by maximizing the coincidence of the two patterns and corresponding reference points, as these patterns and points are observed in two dimensions by the imaging system. Here it is noted that, for macroscopic positioning, the image of the "object" may include only those volume-related features, such as element 58 and point 60, which are required for positioning of the object at the preselected position in the workstation. Therefore, the concept of volume overlap, as the term is used herein, is taken to mean that volume-related features carried on the object are matched with corresponding volume-related features on the image. Thus, any changes in the orientation or position of the object which increase pattern matching are said to increase volume overlap, even though such changes may occur at object positions which are remote (non-overlapping) from the image. Similarly, measuring the macroscopic volume overlap between object and image is taken to mean measuring the extent of pattern matching between object and image.

Figure 4:
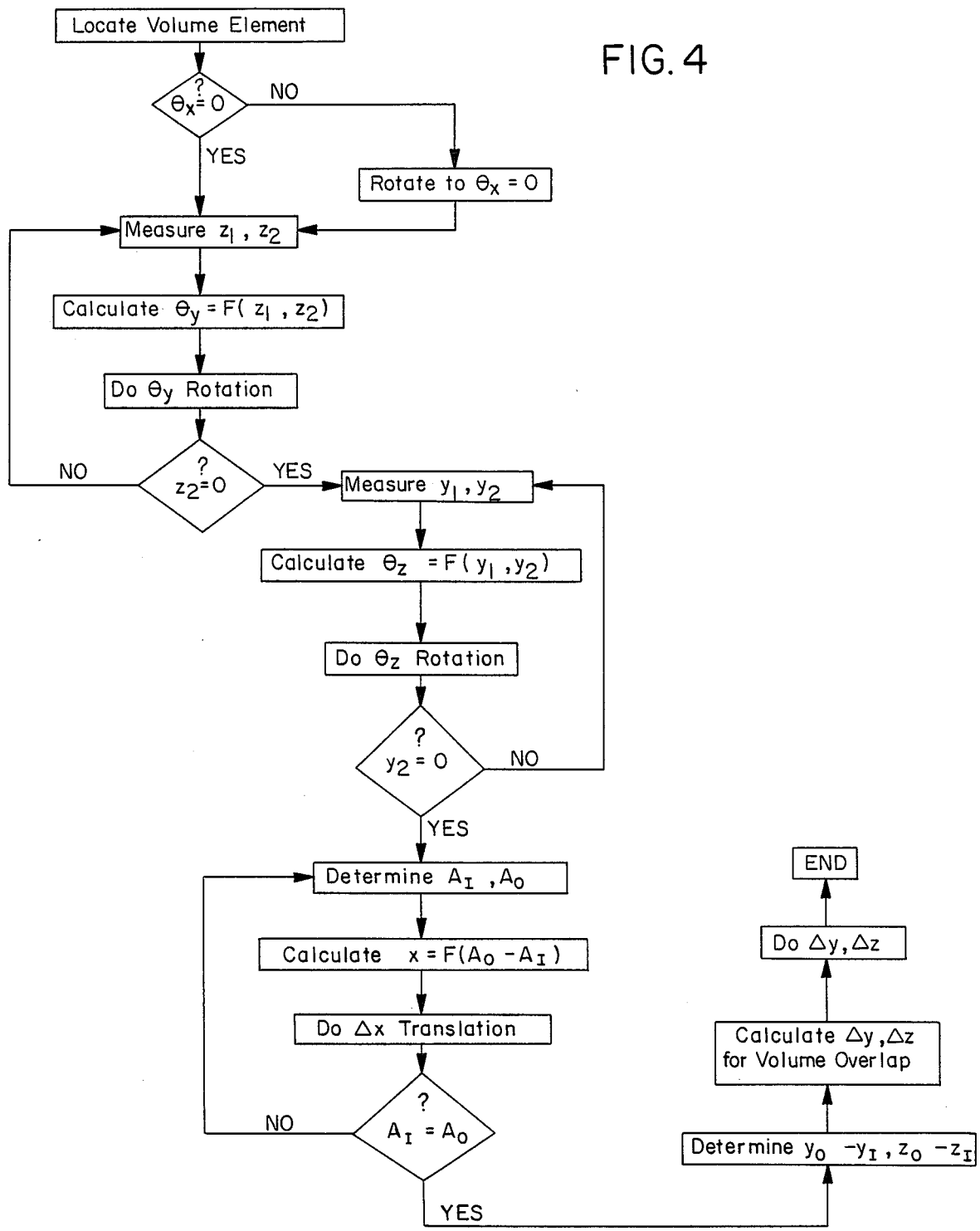
FIG. 4 is a flow diagram of the positioning algorithm used in connection with the method illustrated in FIG. 3.

FIG. 4 shows a flow diagram of the steps carried out by the apparatus in a macroscopic positioning operation. The operation can generally be considered in three parts. The first part involves rotating in object, about one or more of three orthogonal axes, to place the object at the same orientation in space as the image. As shown in FIG. 3A, the X-Y-Z axes of rotation are arbitrarily centered within the volume element, and are selected such that the Y and Z axes define the horizontal and vertical axes, respectively, of the two-dimensional projection of the object on the image field, and the X axis is normal to the plane of the projection, as in FIG. 3B. The mapping from the three-dimensional object in FIG. 3A to its two-dimensional projection in FIG. 3B is indicated by the function $F(x,y,z)$.

The desired rotation about the X axis is made by determining the angle, in the image field, between the Y axis a line which extends from the origin of the axes to reference point 54. This angle, if other than zero, dictates a rotation about the X axis (as effected by the motor control) to bring point 54 into registry with the Y axis. FIG. 3B illustrates the results of the rotation of $\theta_x$ to 0°. It is noted here that in rotating the object about any of the three axes, the axes themselves, which are arbitrary reference axes against which rotation of the effector is measured, do not move.

With continued reference to FIG. 3B, it is seen that the sides 53a, 53b of the cube which are visible in the three-dimensional object, when viewed along the X axis, each forms a rhombus-shaped light strip in the otherwise black volume element in the two-dimensional projection. The width of each strip, in relation to the total dimension of the element along the associated axis, provides a measure of the degree of tilt of the object away from the Z or Y axes. In order to make the Y axis correction, the values of $z_1$, and $z_2$ indicated in FIG. 3B are determined by conventional connectivity analysis calculations. These values are then used to determine, from easily determined geometrical relations, a Y axis rotation value $\theta_y$ which will rotate the volume element to a position shown in FIG. 3C, where the upper face of the cube is normal to the Z axis in the figure. After making this rotation, the rotation about the Y axis is refined, if necessary, to reduce $z_2$ to zero. It will be seen that if the rotation about the Y axis has been too large, a light strip corresponding to the exposed portion of the lower face of the cube will be present, and this strip can be similarly measured and eliminated by a slight back rotation.

A similar type of angular correction, about the Z axis, is made based on the measured values of $y_1$ and $y_2$ indicated in FIG. 3B. The resulting image is shown at FIG. 4D. Here the image has been converted to a completely shaded square, identical to pattern element 58 in the image. The object is now correctly oriented in space for volume overlap with the image in FIG. 3F. Of course, the image itself, if viewed from another angle (and assuming the pattern element is identical to volume element 52) would have a different binary pattern that would then form the "end point" for the object rotations about the X, Y, and Z axes.

The second part of the volume overlap method involves moving the oriented object translationally along the x axis, i.e., toward or way from the imaging device, until the object is in the same Z, Y plane as image 56. This movement can be done readily by moving the object until the size of the volume element pattern, and/or the distance relationships between the pattern and one or more of the reference points are identical in both the object and image. As illustrated in the FIG. 4 flow chart, the method involves calculating the areas of the image ($A_I$) and object ($A_O$) patterns, determining the value of x needed to reduce the $A_O$ to $A_I$, and moving the object accordingly along the x axis. The x-axis distance calculation and movement may be repeated if necessary to produce more exact correspondence in measured area and/or distance relationships between the object and image.

In the third part of the volume overlap procedure, the oriented object is moved in the just-defined Y-Z plane to a position of actual pattern coincidence or overlap with the image pattern. This is accomplished, as indicated in the flow diagram, by determining the pixel-array Y and Z coordinates of corresponding points on the object and image, and determining from this, the amount of Y and Z translation needed to bring the object into overlap with the image.

The volume overlap of the object with the image may be further increased, if desired either by using the correspondence between the associated image and object reference points to determine small translational or rotational changes in object position which produce greater coincidence of points, and/or by increasing the resolution of the imaging device, to refine the above angular and translational movements which were made in achieving initial volume overlap.

According to one aspect of the invention, high-resolution macroscopic positioning can be achieved by refining the volume overlap until fringes formed by interference between the illuminated holographic waves and the reflected object light waves are produced. Studies conducted in support of the present invention indicate that observable interference fringes are formed when the image and object are within about 50 microns. The theory of fringe formation will be discussed below. Here it is noted only that fringe detection may require that the position-calculating system be switched from a pattern-matching mode used for determining volume overlap by pattern matching, to one which is designed for fringe enhancement and detection.

It can be appreciated that the above positioning method can be performed relatively rapidly and efficiently, since the required rotational movement about each of the three axes, and translational movement along each of these axis can be calculated, or closely approximated, independently for each of the six degrees of motion. Accordingly, movement of the object to a position of maximum measurable volume overlap with the image can be achieved with a relatively small number of iterations of each of the above rotational and translational steps.

B. Microscopic Positioning

As indicated above, when an object being positioned is moved within about 50 microns of the holographic image used for positioning, a fringe pattern resulting from interference between the holographic and reflected object waves produce a pattern of fringes is observed. According to one aspect of the invention, the interference pattern and fringe spacing can be analysed to determine micron-range movements in the object which can be used to position the object at a microscopic resolution, i.e., between about 1–50 microns.

The method is an application of real-time holographic interferometry, which has been used heretofore in analysing surface distortions and small rigid-body displacements (Collier, pp. 418–452; Vest, pp 67–127; Ostrovsky; Pethovsek; Sixt; and Stimpjling). The analysis of fringes that arise in real-time interferometry is based on the following assumptions: (1) the holographic reconstruction preserves ideally the phases of the light rays from the original object (i.e., as if the object is still at the image position), and (2) the object under consideration is a diffuse reflector. The significance of assuming a diffuse reflector is that, because of the microscopic roughness of the object, there is a random phase change across different points on the surface so that the only observable interference effects occur between rays from the stationary and displaced surfaces that reflect from the same corresponding surface point.

Figure 5A:
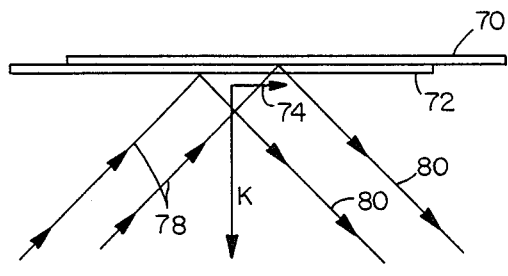
FIG. 5 shows optical configurations and object movement which illustrate different aspects of holographic interference fringe formation.
Figure 5B:
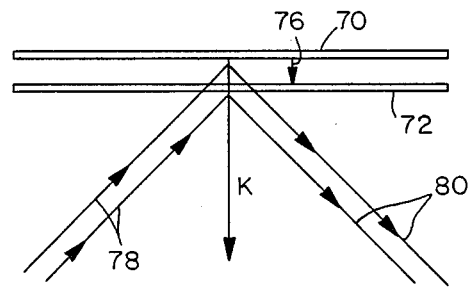

The analysis of holographic interference patterns, and the relationship between object displacement and holographic image will be considered briefly with respect to FIGS. 5 and 6. FIG. 5 illustrates the cases of in-plane (A) and normal (B) displacements between a planar image surface 70 and an object, surface 72, in which the displacement vector (74 in FIG. 5A and 76 in 5B) lies in the plane formed by the illuminating light 78, the surface reflection points, and the observed light 80. The distances from the surface point to the illumination and observations points are assumed to be much greater than the surface displacement so that both sets of rays corresponding to the holographic and displaced surfaces are approximated as being parallel (as illustrated).

Because a ray reflecting from the displaced object traverses a different pathlength than its counterpart from the hologram image, it may arrived at the observation point with a different phase from its holographic counterpart. This phase difference varies continuously across the points on the object surface. Fringes occur because of the destructive interference occurring between the two rays when their pathlengths differ by $(2n+1)/2$ wavelengths (where n is zero or a positive integer). For purposes of analysing the relationship between fringe pattern and object displacement, it is useful to define a sensitivity vector K which is equal to $k_o - k_i$ ($k_o$ and $k_i$ being the observation and illumination propagation vectors, respectively). K therefore lies along the bisector of the angle between the illumination and observation directions. The phase difference $\Delta\phi = K \cdot L$ is then the dot product between K and the displacement vector. In the cases illustrated in FIGS. 5A and 5B, since K is normal to the surface, the phase changes (and hence the fringes) are most sensitive to normal displacements, and relatively insensitive to in-plane displacements. The system in reality is not completely insensitive to in-plane displacements, as the dot product formula is based on the assumption that the illumination and observation points are infinitely distant, which they are not. In the configuration shown in FIG. 5C, which corresponds approximately to the optical configuration shown in FIG. 1, the illuminating light 82 and reflected light 84 define a sensitivity vector K which is non-normal to the line of in-plane displacement. Therefore, the interference pattern is sensitive to in-plane displacements.

Figure 5C:
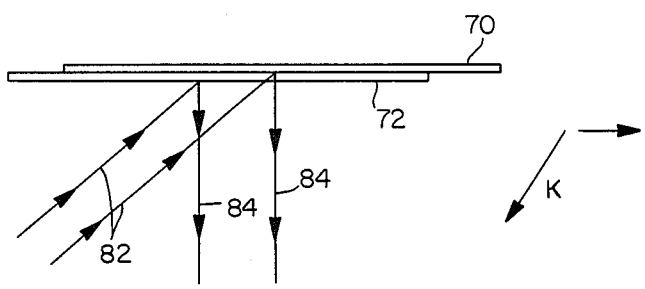
Figure 6B:
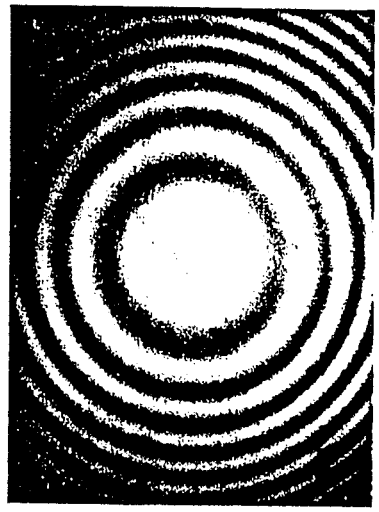
FIG. 6 shows holographic interferometry patterns arising from (A) in-plane displacement, and (B) out-of-plane displacement.
Figure 6A:
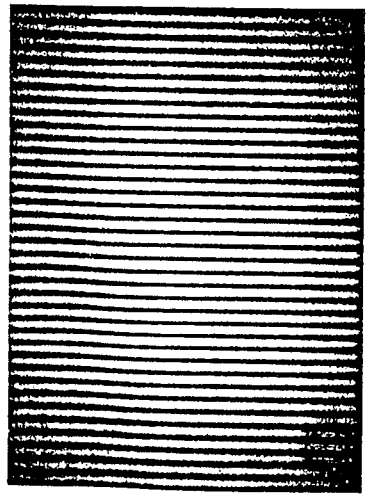

The fringe lines indicate regions where $\Delta\phi$ is constant. In the region of the surface where the observation direction is approximately perpendicular (FIG. 5C), an in-plane translation results in parallel linear fringes that are perpendicular to the translation vector. An exemplary interference pattern for the in-plane displacement shown in FIG. 5C is seen in FIG. 6A. A normal translation results in concentric circular fringes that are centered on the surface point where the observation direction is exactly perpendicular, known as Haidinger fringes. An exemplary pattern, representing out-of-plane displacement in the configuration of FIG. 5C is seen in FIG. 6B.

In summary, when the illumination light is off to the side of the target (as indicated in FIG. 1) and the observation direction is normal to the target surface, the sensitivity vector has a significant in-plane component and the system will exhibit sensitivity to both in-plane, and normal, out-of plane movements. The in-plane displacements result in parallel linear fringes which are perpendicular to the target displacement, and out-of plane movement, in concentric ring fringes. In both cases the spacing between adjacent fringe lines increases as the object and image are more precisely superimposed, due to the greater spacing between regions at which wave interference occurs.

Figure 7:
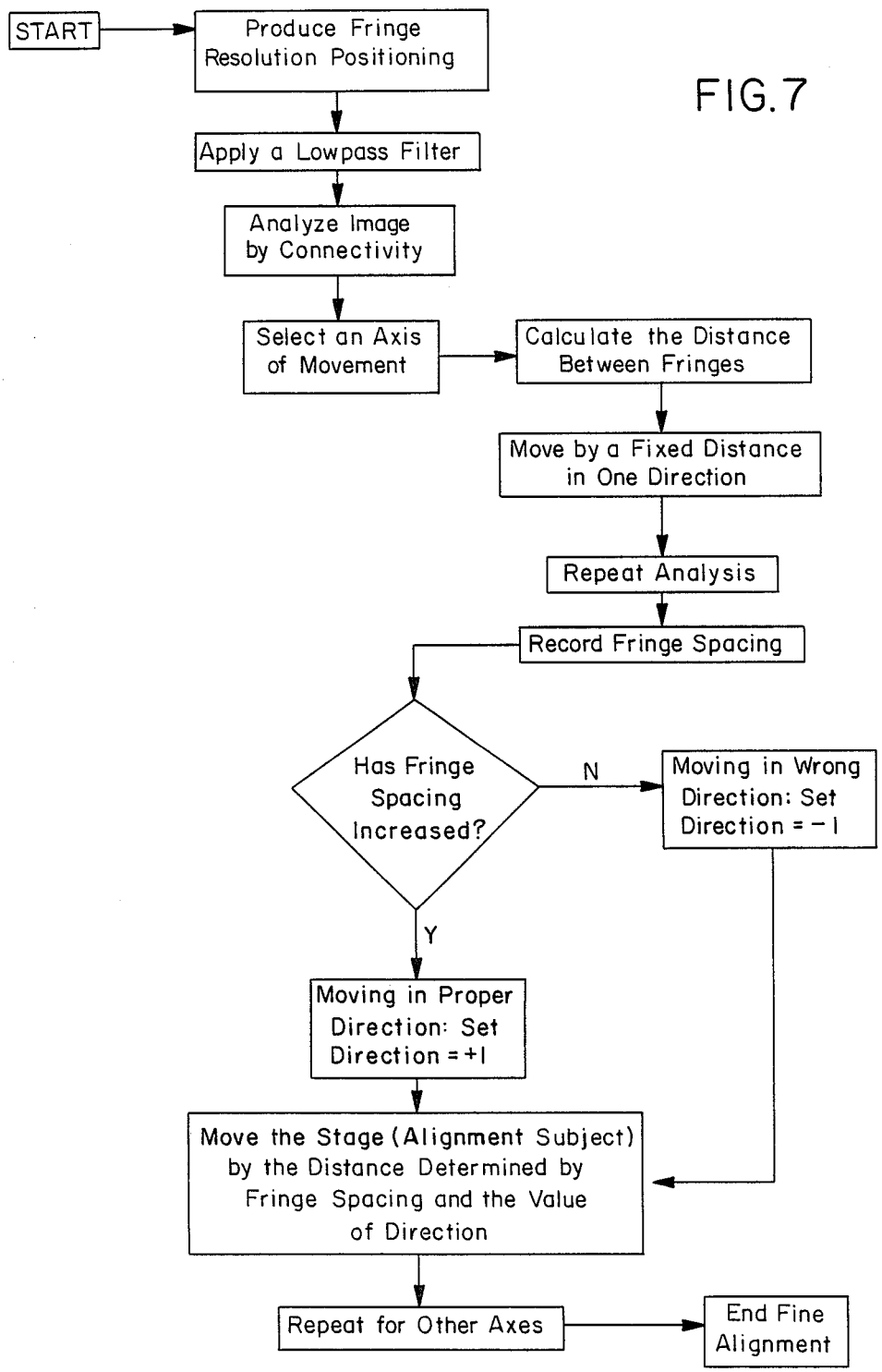
FIG. 7 is a flow diagram of the positioning algorithm used for microscopic positioning, according to the method of the invention.

Automated positioning utilizing the interference fringes has been demonstrated using the apparatus of the invention. FIG. 7 shows a flow chart of the general procedure which is used. For purposes of simplicity, the fringe analysis will be described with respect to a single planar surface which is in near-coincidence with a corresponding planar surface in the holographic image. In practice, the image and object are provided with two intersecting planar surfaces whose sensitivity vectors have different X-Y-Z components, so that the movement in any direction in space will produce a measurable change in fringe spacing in at least of of the two surface pairs. In a preferred approach, the interference patterns generated by the two pairs of corresponding surfaces are separately analysed to determine positional corrections, according to the procedure below.

It is first desirable to employ low-pass spatial filtering on the video image to eliminate speckle noise which interferes with the analysis of the fringes. This yields a binary image of the fringes that is suitable for connectivity analysis, to provide information on the fringe spacing and inclination. The connectivity analysis is used to determine (a) the character of the fringes, (b) the angle of inclination of the fringes, for parallel linear fringes, and (c) the spacing between fringes.

Following connectivity analysis, and based on the character and inclination of the fringe bands, the system selects one of the possible X-Y-Z axes for translational object movement. Here it is noted that the X-Y-Z axes referred to are defined with respect to the corresponding pair of surfaces generating the interference pattern, rather than to the actual direction of robot movement. Thus, when a direction of movement along a reference axis is specified, it is understood that the system contains a suitable transformation matrix for converting the specified motion into actual desired movement in space.

In general, the axis selected initially for object movement will be the one which is calculated to produce the greatest increase on the spacing between the pattern fringes. If the fringe pattern consists of concentric rings, the direction initially chosen will be that normal to the plane of the corresponding surface being analysed. For parallel linear fringes, the direction initially chosen will be that more perpendicular to the inclination of the fringes. For example, for the fringe lines which make an angle of more than about 45° with the horizontal axis, the selected direction of movement would be along this axis.

After selecting an initial axis for movement, the system calculates the incremental distance along the selected axis which will maximize line spacing. The calculation can be based on empirical data relating fringe spacing and object movement which is contained in the system, or on a theory-based formula for calculating displacements, (e.g., as described in Vest, pp. 124–125.).

With reference to the flow diagram in FIG. 7, the object is now moved or shifted a fixed small distance in one direction along the selected axis, and the effect on fringe spacing is evaluated. If the fringe spacing has increased, the object is then shifted along the axis the by the calculated distance. If the fringe spacing decreases, the direction of motion is reversed, and the object is now shifted in this direction the calculated distance. Following this procedure, the fringe pattern is reanalysed, a new axis of object motion is selected, according to the above criterion, and the object positioing procedure is repeated along the selected axis. The procedure is repeated until a desired fringe spacing is achieved.

After positioning with respect to one of the pairs of planar surfaces, the same procedure is applied to the interference pattern produced by the second pair of planar surfaces, to complet object positioning.

Position resolution of about 3 microns has been achieved with the automated method.

III. Applications

The invention is applicable to a variety of robotics tasks requiring positioning at macroscopic resolution. The apparatus may be used, for example, to guide a workpiece in an assembly procedure to a desired position for assembly or machining or other processing. One advantage of the system in this type of application is that the desired robot position can be readily adjusted and monitored by holograph projection methods.

A general application for which the invention is uniquely suited is in robotics positioning in which the vision system used to guide robot movement does not have a fixed frame of reference. This will be the case in most robotic docking procedures in which mobile robots, at least one of which is equipped equipped with a vision system, are required to interact physically at an arbitrary location in three-dimensional space. Similarly, the method can be used to guide a robot with a vision system to any desired position in space, independent of the spatial relationship between the vision system and image position.

For microscopic robot positioning, the invention provides a unique method for combining gross and high-resolution positioning in a single system based on object coincidence with a holographic position. The invention is thus well-suited to industrial tasks, such as optical fiber positioning, microchip processing, and the like where the work object needs to be moved over relatively long distances in space, macroscopically positioned, then moved over micron-range distances to achieve position resolution of a few microns or less.

While the invention has been described with reference to preferred embodiments and features, it will be apparent that various changes and modifications can be made with departing from the invention.

It is claimed:

1. A method of positioning a three-dimensional object at a preselected position within a workstation, comprising
   producing a 3-dimensional holographic image of the object at such preselected position,
   measuring the macroscopic volume overlap of the object and the image,
   moving the object in a direction which increases the volume overlap of the object with the image,
   repeating said measuring and moving until the object and image produce a detectable pattern of illumination-beam interference fringes,
   analyzing the fringe pattern to determine the direction of object movement needed to maximize the spacing between the pattern fringes;
   incrementally shifting the object in such direction, and
   repeating said analyzing and shifting steps until a desired increase in fringe spacing is achieved.

2. The method of claim 1, wherein the object has a volume element with light and dark surface features that generate a light and dark pattern whose size and shape vary, in a two-dimensional projection, according to the volume element's orientation in space and its distance from a selected viewing plane, the image carries a pattern which matches in size and shape that of the volume element, in a two-dimensional projection, when the object is oriented for volume overlap with the image, and said measuring includes determining the extent to which the pattern associated with the volume element matches that associated with the image.

3. The method of claim 2, wherein said measuring and moving includes orienting the object angularly and adjusting its distance from the selected viewing plane, to produce a volume element pattern which can be matched, in size and shape, with the pattern associated with the image, and moving the object into a position at which the object pattern matches the image pattern.

4. The method of claim 1 wherein the object and image each define two non-parallel reference surfaces, illumination-beam interference fringes are formed at each object reference surface, when maximum macroscopic overlap is achieved, and said analyzing and shifting are separately applied to the fringes produced at each object reference surface, wherein the object is moved in a direction normal to such reference surface, to increase the spacing between annular fringes formed on such surface, and in an in-plane direction having a component which is normal to the direction of the fringes, to increase the spacing between parallel linear fringes formed on such surface.

5. Apparatus for automated positioning of a three-dimensional object at a preselected position within a workstation, comprising
   an optical system for producing a 3-dimensional holographic image of the object at such preselected position,
   a mechanical drive system for moving the object in the workstation toward a position of maximum volume overlap with the image,
   an imaging device including means for detecting macroscopic features related to the extent of volume overlap of the object with the image as evidenced by the appearance of interference fringes which form when the volume overlap is about 50 microns in any direction, and means for determining the spacing between such interference fringes, when the volume overlap is less than about 50 microns in any direction, and
   position calculating means operatively connected to the imaging device and drive system to direct the system, in response to information received from the imaging device, for moving in a direction which produces greater macroscopic volume overlap between the object and image when the volume overlap is greater than about 50 microns and for maximizing the spacing between such interference fringes, when the volume overlap is less than about 50 microns.

6. The method of claim 5, for use in positioning an object having a volume element with light and dark surface features that generate a light and dark pattern whose size and shape vary, in a two-dimensional projection, according to the volume element's orientation in space and its distance from a selected viewing plane, wherein the image produced has a pattern which matches in size and shape that of the volume element, in a two-dimensional projection, when the object is oriented for volume overlap with the image, and said position calculating means is designed to determine the extent to which the size and shape of the pattern associated with the volume element matches that associated with the image.

7. The apparatus of claim 9, wherein the object and image each contain two non-parallel reference surfaces, illumination-beam interference fringes are formed at each object reference surface, when macroscopic overlap is achieved, and said analyzing means is applied to the fringes produced at each object surface separately, wherein the object is moved in a direction normal to such reference surface, to maximize the spacing between annular fringes formed on such surface, and in an in-plane direction having a component which is normal to the direction of the fringes, to maximize the spacing between parallel, linear fringes associated with that surface.

* * * * *